April 30, 1963  C. R. VENABLE, JR., ET AL  3,087,515
IMPERMEABLE BARRIER IN CEMENT LINED PIPE
Filed July 11, 1960

INVENTORS
C.R. VENABLE, JR
R.S. LADLEY
BY Hudson and Young
ATTORNEYS

United States Patent Office 3,087,515
Patented Apr. 30, 1963

3,087,515
IMPERMEABLE BARRIER IN CEMENT LINED PIPE
Charles R. Venable, Jr., and Roy S. Ladley, Bartlesville, Okla., assignors to Phillips Petroleum Company, a corporation of Delaware
Filed July 11, 1960, Ser. No. 41,815
3 Claims. (Cl. 138—145)

This invention relates to cement lined conduits such as cement lined metal pipes. In one aspect it relates to a cement lined pipe having an impermeable, flexible barrier between the pipe and the cement lining of the pipe. In another aspect the invention relates to a method for installing an impermeable plastic barrier between the interior of a pipe and the cement lining of a cement lined pipe. In still another aspect this invention relates to a method and means for continuing the protection of a cement lined metal pipe from the corrosive effects of materials being transported by the pipe in the event of failure or partial failure of the cement lining of the pipe.

For many years pipes and other conduits have been lined with hydraulic cement and such cement lined pipes have been used for handling oil field brines and other corrosive fluids, particularly fluids which are encountered in the petroleum industry. While these cement linings have provided a measure of protection for the pipe lines, there have often been failures in such installations which have presented an ever-present problem of detecting and replacing pipe lines or sections of pipe lines wherein the lining has failed. Minute cracks which sometimes occur in the lining, possibly as a result of expansion and contraction of the metal pipe or as a result of flexing the pipe during handling or during use, allow corrosive fluids to penetrate the lining and attack the pipe. Anything which causes a rupture of the hydraulic cement lining will tend to result in failure of the pipe when such pipe is used to transport corrosive fluids. In one particular installation where sulfate-reducing bacteria are known to be present in the crude oil and salt water being transported cement lined steel pipe has been found to be very little better than unlined steel pipe. Such bacteria have been found beneath the cement lining of cement lined pipe; however, if the cement lining allows the fluids being transported to come in contact with the metal pipe, corrosion can result in galvanic action or chemical action in addition to attack by bacteria.

It is a principal object of this invention to provide an impermeable barrier between the metal pipe and the cement lining of a cement lined pipe. It is also an object of this invention to provide a method for installing an impermeable barrier between a metal pipe and the cement lining of such pipe. A further object of this invention is to provide a method for welding together joints of cement lined pipe having therein the plastic barrier of this invention without destroying the impermeable plastic barrier where the welding occurs. Other and further advantages of this invention will become evident to one skilled in the art upon study of this disclosure including the detailed description of the invention and the drawing wherein:

Figure 1:
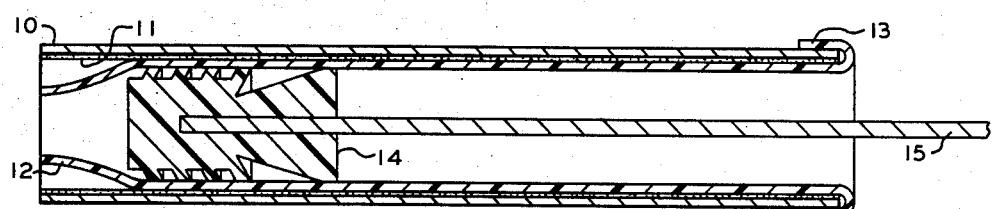
FIGURE 1 is a cross sectional view of a section of metal pipe having an impermeable plastic lining installed therein.

Referring now to the drawing, and particularly to FIGURE 1, a joint of metal pipe 10 has a cement lining 11, which can comprise a relatively thin slurry of hydraulic cement in water or other suitable cementing material for the purpose of securing to the interior of the pipe wall the plastic tube 12 until the cement lining can be applied to the plastic lined pipe. The plastic tube 12 has substantially the same outside diameter as the inside diameter of the pipe so as to avoid wrinkles, air pockets, or undue stretching of the plastic tube. The plastic tube extends beyond the ends of the metal pipe and preferably the ends are turned back over the end of the metal pipe as indicated at 13. This turned-back section can be secured by tying with cord or secured by metal or other bands if desired although it is usually not necessary to secure this turned-back section of plastic tube 12. After installation of the plastic tube it can be inflated by closing one end and introducing compressed air or other gas into the other end. This can conveniently be accomplished by utilizing the exhaust from a vacuum sweeper or other source of low pressure compressed air. Inflating the tube will cause it to contact and adhere to the wet interior of the pipe. It is usually advisable to pass a rubber or other resilient plug, indicated at 14, through the pipe to remove any trapped air between the plastic tube and the metal pipe. The plug can have a handle 15 or can be passed through the pipe by means of a pressure fluid.

Figure 2:
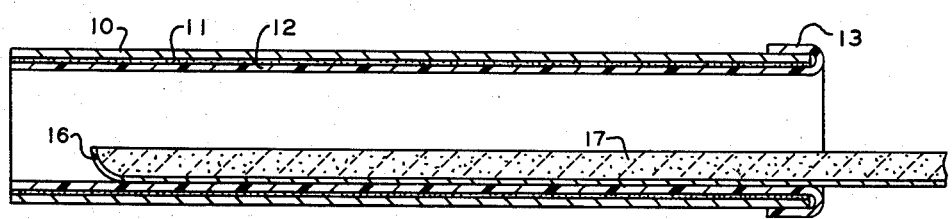
FIGURE 2 represents the introduction of the cement slurry to the plastic lined pipe.
Figure 3:
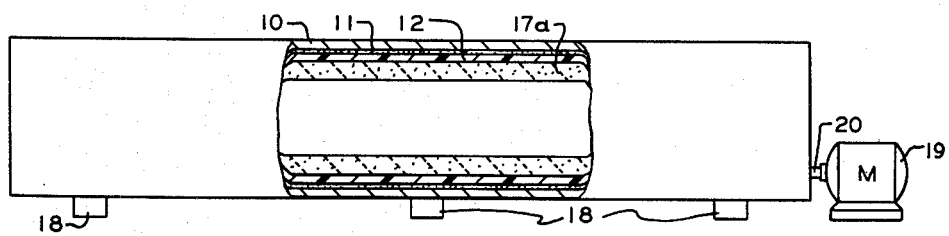
FIGURE 3 shows the distribution of the cement on the interior of the plastic lined pipe as a result of spinning the pipe.
Figure 4:
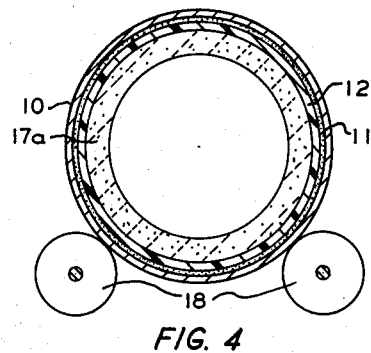
FIGURE 4 is an end view of the pipe represented in FIGURE 3 showing the relationship of the rollers with respect to the pipe which is spun thereby.

The cement slurry for providing the cement lining of the pipe can be introduced to the interior of the pipe by means of a trough 16, as shown in FIGURE 2, and the pipe rotated so as to invert and empty the trough 16 after which the trough can be removed, leaving the cement 17 in the pipe. The section of pipe is then rotated about its longitudinal axis so as to distribute the cement evenly upon the interior of the pipe. Conventional pipe spinning equipment comprises rollers 18 actuated by motor 19 by means of shaft 20, as shown in FIGURE 3. The pipe is rotated or spun until the cement has taken a sufficient set to be self-supporting after which the turned back ends of the plastic tube 12 can be trimmed off and the cement lining of the pipe is subjected to conventional curing procedure. FIGURE 4 shows the relationship of rollers 18 to the pipe 12.

The plastic tube which provides the impermeable barrier between the metal pipe and the cement lining of the pipe can be any impermeable, flexible material such as rubber or the so-called organic plastics including solid polyolefins, nylon, polyvinylchloride, and the like, and mixtures thereof. A particularly preferred material is a mixture of a copolymer of ethylene with a higher 1-olefin, such as a copolymer of ethylene and 1-butene and rubber. Natural rubber or a synthetic rubber such as SBR, polyisobutylene, Thiokol, and the like, can be used alone or in admixture with one of the above organic plastic materials. A synthetic rubber such as polyisobutylene is usually preferred because it is more impermeable to water vapor than is natural rubber.

A particularly preferred material for making the plastic tubing impermeable barrier for use in this invention is the class of solid linear polymer of 1-olefins, particularly linear solid polyethylene prepared by the low pressure polymerization of ethylene in the presence of an organic diluent and a solid chromium oxide-containing catalyst. Such polyethylene can be prepared by the method described in U.S. Patent 2,825,721, issued March 4, 1958, to J. P. Hogan, et al.

The impermeable membrane which has been described as a tube can also be installed as a sheet although the installation is more difficult. The tubing or sheeting will be ordinarily only a few mils in thickness such as about 3 to about 10 mils in thickness particularly if the tubing or sheeting is linear solid polyethylene as above described because the polyethylene has a high tensile strength value as compared to other organic plastics.

Conventional equipment for applying cement lining to steel pipes can be employed in the fabrication of the improved cement lined pipe of this invention. The introduction of the cement slurry to the metal pipe having installed therein the impermeable membrane is preferably done by means of a trough fabricated from linear solid polyethylene and having rounded ends and sides so as to avoid the possibility of rupturing the membrane during introduction of the cement slurry.

The joints of cement lined pipe having therein the impermeable membrane of this invention can be joined together by welding or by threaded coupling or bolted flanges provided ordinary precautions are taken to maintain protection of the pipe and/or fittings at the junction of the sections of pipe. If the pipe sections are to be welded together, the ends of the pipe can be "buttered" or otherwise covered with a pipe joint compound such as described in U.S. Patents 1,822,663 and 1,822,536, both issued in 1931. Satisfactory sealing compounds are available under the name of X-Pando Pipe Joint Compound from X-Pando Corporation, Long Island, New York. Such compound should be free from carbonates to avoid $CO_2$ evolution upon heating. The pipe ends with the covering of pipe joint compound are pressed together, the excess pipe joint compound is wiped off and the joints are welded together according to usual practice. Tests have shown that the use of the pipe joint compounds prevents destruction of the plastic lining at the weld. If couplings are to be used for joining threaded pipe, a sealing compound, such as ordinarily used with cement lined pipe, should be employed in the coupling to protect the coupling from the corrosive fluids which may be encountered and to provide a seal where the ends of the cement lined pipe do not meet.

The following specific example of an application of the invention will be helpful toward an understanding of the invention but is not to be construed as limiting the invention.

*Example*

Several hundred feet of steel pipe lining prepared according to the invention were installed in oil field use for conducting the fluid produced from an oil well to the tank battery. The fluid comprised a mixture of crude oil and salt water. The membrane used between the steel pipe and the cement lining was a continuous tubing about 4 to 9 mils in thickness composed of a blend of polyisobutylene and a copolymer of ethylene and 1-butene containing about 2 weight percent of 1-butene and having a melt index of 0.5. The blend was in the ratio of 70 parts by weight copolymer to 30 parts by weight polyisobutylene. The copolymer was made according to Patent No. 2,825,721, issued March 4, 1958, to J. P. Hogan et al. and the polyisobutylene was made according to the process disclosed in U.S. Patent 2,240,582, issued June 9, 1938, to Wm. J. Sparks, and had a molecular weight in the range of 120,000 to 160,000. The plastic tubing was prepared by blending pellets of the copolymer with a block of the polyisobutylene in a Banbury mixer and then extruding the blend at elevated temperature into a continuous tube. The melt index, as referred to herein, is determined in accordance with ASTM method D1238–52T. The joints of pipe were prepared as hereinbefore described and illustrated, using a conventional slurry of hydraulic cement for preparing the cement lining. The ends of the wipe were "buttered" with a paste made by mixing water with a powder having the following composition:

| | Weight percent |
|---|---|
| MgO | Major (66–70) |
| $SiO_2$ | 14–15 |
| $BaSO_4$ | 5 |
| Graphite | 10–12 |
| CaO | 1–2 |

The pipe ends were pressed together, the excess paste wiped off and the pipe sections welded together.

It was determined that some of the pipe sections had voids existing between the cement lining and the pipe and these places were marked on the outside of the pipe before it was installed. After about 6 weeks' use the pipe was removed from service and examined. Failures were noted in the cement lining in those places where voids were known to have existed; however, in most instances the plastic lining was still intact and the steel pipe was still protected from the fluid present in the pipe. At some places the plastic lining was ruptured and is believed to have been mechanically ruptured by pieces of cement that had been separated from the pipe at points upstream.

The voids between the cement lining and the pipe were caused by use of rubber tired rollers on the pipe spinning equipment used to rotate the pipe and this was corrected by replacing the rubber tired rollers with steel rollers. It is believed that the vibration of the pipe by the steel rollers prevented entrapment of air pockets between the cement lining and the pipe because the joints of pipe which were rotated on the steel rollers to distribute the cement over the inside surface of the pipe were substantially free from voids. It has also been found that rotating the pipe slowly when the cement is introduced into the plastic lined pipe until the cement is fairly well distributed over the inner walls of the pipe will avoid formation of voids between the plastic tube and pipe wall. Rotating the pipe rapidly upon introduction of the charge of cement can cause the plastic tube to slip with the formation of wrinkles in the tube and voids between the tube and pipe wall.

The plastic lining adequately protects the steel pipe from the fluids being transported in the pipe line where access of the fluids to the metal has been by means of minute cracks in the cement lining. Hydraulic cement does not adhere to the plastic lining with the same tenacity as it would to bare steel pipe. However, the cement lining is self-supporting after it has been cured by reason of its inherent rigidity and strength when set. The plastic lining, therefore, will provide considerable protection against corrosion even if the cement inner lining is damaged by excessively rough handling or other physical causes.

That which is claimed is:

1. A lined metal pipe comprising a metal layer, a cement inner lining within the metal layer, a flexible impermeable membrane between the cement lining and the metal pipe and a thin hydraulic cement layer securing the impermeable layer to the metal pipe.

2. A lined metal pipe comprising a metal layer, a cement inner lining within the metal layer, a flexible impermeable membrane between the cement lining and the metal pipe and a thin hydraulic cement layer securing the impermeable layer to the metal pipe and the cement inner layer.

3. The method of providing an impermeable barrier between the interior wall of a substantially horizontal cement lined pipe and the cement lining of said pipe which comprises coating the interior of the pipe with a cement-water slurry; inserting a thin-walled plastic tubing having substantially the same outside diameter as the inside diameter of the pipe; inflating tubing so as to contact the wet interior of the pipe; pressing the tubing against the pipe wall progressively from one end to the other to eliminate air bubbles; introducing into the substantially horizontal pipe the amount of cement-water slurry required to provide the cement lining; rotating the pipe with vibration about its longitudinal axis so as to distribute the cement lining for a time sufficient to cause the cement to set; and curing the cement lining.

(References on following page)

References Cited in the file of this patent

UNITED STATES PATENTS

| | | |
|---|---|---|
| 1,570,445 | Merrill | Jan. 19, 1926 |
| 1,643,021 | Luyties | Sept. 20, 1927 |
| 1,979,655 | Whiting | Nov. 6, 1934 |
| 1,979,655 | Whiting | Nov. 6, 1934 |
| 2,230,626 | Miller | Feb. 4, 1941 |
| 2,597,706 | Couchman | May 20, 1952 |
| 2,677,165 | Copenhover et al. | May 4, 1954 |
| 2,724,672 | Rubin | Nov. 22, 1955 |

FOREIGN PATENTS

| | | |
|---|---|---|
| 800,956 | Great Britain | Sept. 3, 1958 |
| 825,909 | Great Britain | Dec. 23, 1959 |